United States Patent [19]
Martino et al.

[11] Patent Number: 6,023,670
[45] Date of Patent: *Feb. 8, 2000

[54] NATURAL LANGUAGE DETERMINATION USING CORRELATION BETWEEN COMMON WORDS

[75] Inventors: Michael John Martino; Robert Charles Paulsen, Jr., both of Austin, Tex.

[73] Assignee: International Business Machines Corporation, Armonk, N.Y.

[ * ] Notice: This patent is subject to a terminal disclaimer.

[21] Appl. No.: 08/769,842

[22] Filed: Dec. 20, 1996

Related U.S. Application Data

[63] Continuation-in-part of application No. 08/699,412, Aug. 19, 1996.

[51] Int. Cl.[7] .............................. G06F 17/28; G06F 17/21
[52] U.S. Cl. .................................. 704/8; 704/1; 707/536
[58] Field of Search .................................. 704/1, 2, 3, 4, 704/8, 9, 7; 707/531, 533, 535, 536

[56] References Cited

U.S. PATENT DOCUMENTS

| | | | |
|---|---|---|---|
| 4,610,025 | 9/1986 | Blum et al. | 382/177 |
| 4,773,009 | 9/1988 | Kucera et al. | 707/351 |
| 4,829,580 | 5/1989 | Church | 704/260 |
| 5,062,143 | 10/1991 | Schmitt | 382/230 |
| 5,182,708 | 1/1993 | Ejiri | 704/1 |
| 5,251,131 | 10/1993 | Masand et al. | 704/9 |
| 5,371,673 | 12/1994 | Fan | 704/1 |
| 5,371,807 | 12/1994 | Register et al. | 382/159 |
| 5,392,419 | 2/1995 | Walton | 395/500 |
| 5,418,951 | 5/1995 | Damashek | 707/5 |
| 5,548,507 | 8/1996 | Martino et al. | 704/1 |
| 5,623,609 | 4/1997 | Kaye et al. | 704/1 |

FOREIGN PATENT DOCUMENTS

WO91/02347  2/1991  WIPO.

*Primary Examiner*—Joseph Thomas
*Attorney, Agent, or Firm*—Jeffrey S. LaBaw

[57] ABSTRACT

The language in which a computer document is written is identified. A plurality of words from the document are compared to words in a word list associated with a candidate language. The words in the word list are a selection of the most frequently used words in the candidate language. A count of matches between words in the document and words in the word list for each word in the word list to produce a sample count. The sample count is correlated to a reference count for the candidate language to produce a correlation score for the candidate language. The language of the document is identified based on the correlation score. Generally, there are a plurality of candidate languages. Thus, comparing, accumulating, correlating and identifying processes are practiced for each language. The language of the document is identified as the candidate language having a reference count which generates a highest correlation score.

25 Claims, 3 Drawing Sheets

NATURAL LANGUAGE DETERMINATION USING CORRELATION BETWEEN COMMON WORDS

This application is a continuation in part of copending, commonly assigned application entitled "Word Counting for Natural Language Determination", Ser. No., 08/699,412 filed Aug. 19, 1996 by the same inventors which is hereby incorporated by reference.

BACKGROUND OF THE INVENTION

The subject invention relates generally to human language recognition technology. More particularly, the invention relates to a technique for identifying the language used in a computerized document.

Computers and computer networks have intensified the transmission of coded documents between people who speak and write in different natural languages. The internet has recently accelerated this process. This results in several problems. In the prior art, for example, when an electronic document was sent across national boundaries, computer system operations were interrupted so that a human being could determine the natural language of a received document before a given operation such as selecting, displaying, printing, and so forth which may be dependent upon the peculiarities of an given natural language. In the context of an internet search, unless the user is multilingual, he is likely to be interested only in the retrieved documents in his native language, or at any rate, only those languages he reads. Furthermore, there is a increasing use of visual and audio segments, both in advertising materials and educational products as well as other items available on the internet. It is extremely useful, before the time consuming download of a visual and audio segment, to assure that it is understandable, or alternatively, to provide for translation or substitution to a desired language.

The invention described herein eliminates the need for such human intervention by automatically determining the correct natural language of the computer recorded document.

Prior to the applicants' own contributions to the art, the general problem was recognized in the prior art. In the area of automated language identification of coded text, the prior art used n-gram character based systems, which handle each character multiple times, a process which consumes a great deal of system resource when compared to the applicants' word-based technique described below. In speech recognition systems, language recognition uses language and speech characteristics, e.g., trigrams or emphasis which require large amounts of text to be parsed and measured, and large amounts of time for processing. These techniques are based on some form of matching algorithm based on language statistics that are not meaningful in a linguistic context.

Prior systems using trigrams, n-grams, and other artificial divisions in a computerized text are not considered reliable, and they are very slow and consume considerable computer time, as they handle each character multiple times for a document, e.g., each document character appears in three different trigrams. Characteristics measured, or derived from, but which are not actual components of written languages such as trigrams or letter sequences, have limited success in identifying the correct language, and require large amounts of text to be parsed and measured. Similarly, prior systems which depend on the attributes of individual characters and their local contexts are also limited when applied to the problem of identifying a language.

In the invention described herein, none of the prior art techniques, e.g., classifying language by signal waveform characteristics, trigrams, n-grams, or artificial divisions of written language, were used. In both inventions, words are read from a computer document and compared to predetermined lists of words selected from a plurality of languages of interest. The word lists comprise relatively few of the most commonly used words in each language; statistically, a significant percentage of all words in any document will be the most common words used in its language. The language or genre of the document is identified by a process that determines which language's word-list most closely matches the words in the document.

In related applications, the applicants have taught that the closeness of match can be determined by a weighted or nonweighted sum of the occurrences of the words in the word lists for each language or genre of interest. The nonweighted sum is called the simple counting embodiment. Each language's word list and the associated frequency of occurrence for each word in the list is kept in a word table. The word table is linked with a respective accumulator whose value is increased each time a word from an inputted document matches one of the common words in one of the tables.

The present application is an improvement of the basic inventions of word counting for natural language determination. It should provide a relatively greater degree of discrimination in language identification than the weighted or simple counting methods proposed by the applicants in prior applications.

SUMMARY OF THE INVENTION

It is an object of the invention to identify the natural language in which a document is written.

This object and others are accomplished by a technique for identifying a language in which a computer by identifying the language in which a computer document is written. A plurality of words from the document are compared to words in a word list associated with a candidate language. The words in the word list are a selection of the most frequently used words in the candidate language. A count of matches between words in the document and words in the word list for each word in the word list to produce a sample count. The sample count is correlated to a reference count for the candidate language to produce a correlation score for the candidate language. The language of the document is identified based on the correlation score. Generally, there are a plurality of candidate languages. Thus, comparing, accumulating, correlating and identifying processes are practiced for each language. The language of the document is identified as the candidate language having a reference count which generates a highest correlation score.

The speed of language determination by this invention is very fast, because only a relatively small number of words need to be read from any document to reliably determine its language or genre.

Further, an advantage of the present invention is that only a few words, e.g., 25–200, need be contained in the Word Frequency Table for each candidate language of interest, so that in practice each word is compared with only a relatively small number of words for reliable language recognition. As discussed below, it is important that word selected for the word frequency tables for each language cover a commensurate percentage of the frequency of occurrences in their respective languages.

DETAILED DESCRIPTION OF THE DRAWINGS

Figure 1:
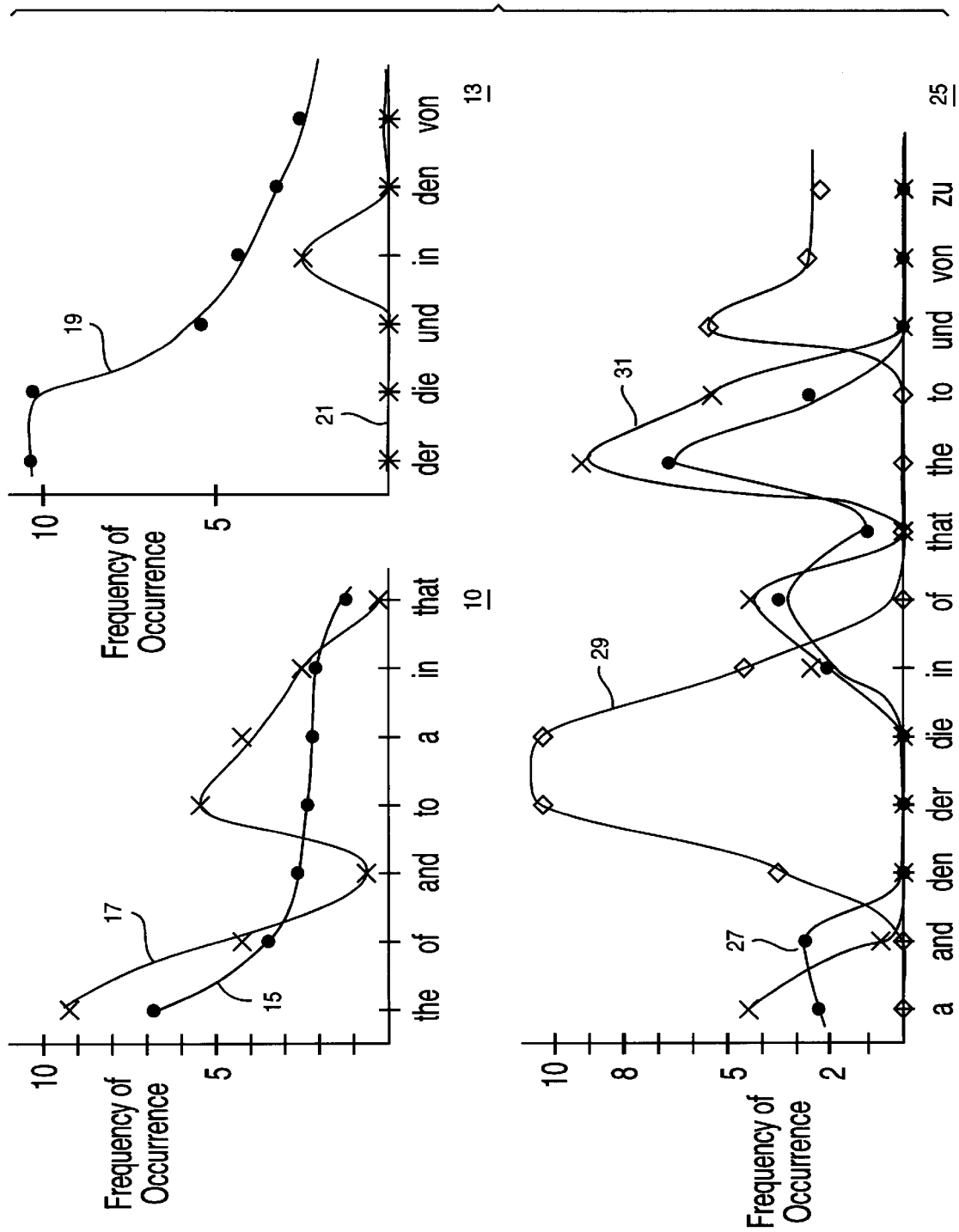
FIG. 1 depicts several sample and reference curves for identifying the language in which a document is written according to the invention.

In this specification, the term "language" means a natural language, i.e. human language, used for human communications, e.g., English, French, Spanish, German, and so forth. The term "language", as used in the claims, also applies to "genres" within a natural language. Genre is defined herein as a distinctive style of use of a language in some specific context. For example, genre within English includes technical writing, business writing, legal writing, medical writing, fiction, and many others. Thus, genre applies to different variations of the same language involving different styles and manners of word use within a natural language which are reflected in coded documents, and may involve a distinctive use of standard words in a language or may add new words to a language. Genre may reflect particular jargons and dialects of a language such as High German, Low German, and Swiss German, or as London English and New York English. This invention which uses correlation is especially effective in discriminating between genres as will be explained below.

Ideographic languages such as Japanese, Chinese and Korean can be handled by this invention in a computer mechanism by choosing an appropriate internally-coded representation for the ideographs, such as the double-byte codes used for such languages in computers today. Thus, the mechanism of this invention can be applied to any language having coded words, without regard to the alphabet or word form required for the human-readable printed symbols used for the respective languages.

In the preferred embodiment, this invention uses a mathematical correlation function to compute the similarity of a word count derived from a body of text in an unknown language and a set of references for each of a plurality of known languages or genres within a language.

The computed correlation value, which may range from −1.0 to 1.0, is a measure of the similarity of the shapes of the word count curves. The body of text is declared to be in the natural language or genre of the reference curve whose shape most nearly matches that of the sample from the body of unknown text, as indicated by the correlation function which has the largest value.

One of the advantages of this invention is the determination of natural language or genre using the frequently occurring words in each of the different natural languages. The invention is expected to have its greatest application in discriminating among genre, as compared to the weighted or simple counting methods also proposed by the applicants in the copending, commonly assigned application, Ser. No. 08/723,815, entitled "Natural Language Determination Using Partial Words" hereby incorporated by reference. The reason that the invention is especially useful in determining genre is that the word frequency lists which will be used to discriminate among genre in a given language will be very similar; that is, the word lists for each of the candidate genre will contain many of the same words. The main difference between the words lists is that different frequencies of use are associated with a given common word in a respective genre. The discrimination among different genre will be made based on the difference among the relative frequencies of the same set of words. As the difference between genre are somewhat more subtle than those between languages, the correlation function is especially useful as it is sensitive to small differences, not just overall frequency difference by word count.

The correlation function is used to determine the degree to which two or more curves are similar. One of the curves is designated the reference curve and the other the sample curve, when data from an unknown document is being compared to data from one or more known languages or genres. If there is a single reference curve, the correlation function is used to determine the degree of match to the reference language or genre. Thus, in an alternative embodiment, the invention can be used to determine whether a document is in a particular language rather than selecting among a set of candidate languages. Where there are a plurality of candidate languages, the applicants use multiple reference curves, each reflecting the use of common words in a respective natural language. The sample curve's match to the reference curves, according to the correlation function, is used to determine in which of a plurality of candidate languages or genres a given sample of common words is written.

As shown in FIG. 1, the sample curves and the reference curves can be arranged in several different ways. The curves use the words as the x-axis and some measure of the frequency of occurrence of the words in the candidate languages. Separate sample reference and sample curves using only the words in each of the candidate languages may be used. In the graph 10 at the top of the figure, a separate reference curve 15 is shown with a sample curve 17 using the words in the American English word list. Also, at the top of the figure, graph 13 shows a reference curve 19 and a sample curve 21 using words in the German word list. The reference and sample curves in graphs 10 and 13 are arranged in order of descending frequency of occurrence and are truncated from a normal length of 40 to 200 words. However, even in the truncated state, it is relatively easy to see that it is much more likely that the sample is in American English than German.

Alternatively, as shown in the graph 25 in the bottom half of the figure, all of the common words in the word lists of all the candidate languages may be arranged along the x-axis. The example shows a few words in American English and German arranged in alphabetical order, many more would ordinarily be in the reference curves. A reference curve for American English 27 and German 29 are shown. Notice that these curves have a zero value for words which do not occur among the more common words of the language; the word "in" is in both languages. A sample curve 31 is shown which includes the occurrences of the American English and German words in the reference curves. Again, it is easy to see that the sample is most likely in American English.

Although the curves in the figure are drawn as smooth curves in actuality the words are discontinuous counts which may be arranged in any order so long as frequency data for the words from the sample are matched to frequency data for the same words in the respective reference counts.

There are several formulations of the correlation function; for the purposes of the invention, all are equivalent, but they are useful in different situations. In Table 1, multiple word count samples curves are created, one for each language. Each of these word count samples are compared with the reference curve for the given language. For example, using just the first 7 words from English, German, and Danish and the paragraph above, the words, their sample counts and the reference counts would be:

TABLE 1

Reference and Sample Occurrence Percents

| Englh | Rfnce | Smple | Grman | Rfnce | Smple | Dnish | Rfnce | Smple |
|---|---|---|---|---|---|---|---|---|
| the | 6.90 | 9.09 | der | 10.3 | 0.0 | i | 2.95 | 0.0 |
| of | 3.59 | 4.24 | die | 10.3 | 0.0 | og | 2.90 | 0.0 |
| and | 2.85 | 0.61 | und | 5.50 | 0.0 | at | 1.81 | 0.0 |
| to | 2.58 | 5.45 | in | 4.85 | 2.42 | er | 1.81 | 0.0 |
| a | 2.29 | 4.24 | den | 3.31 | 0.0 | det | 1.53 | 0.0 |
| in | 2.10 | 2.42 | von | 2.81 | 0.0 | en | 1.53 | 0.0 |
| that | 1.05 | 0.0 | zu | 2.76 | 0.0 | til | 1.53 | 0.0 |

In Table 2 below, the correlation scores for the sample text against each of the different languages are presented. In each case, the correlation for the language is given by using the formula below for the words that occur in the sample and in the reference for the given language. Note that this is just an example to explain the principles of the invention. In one preferred embodiment, the words in the word lists would be chosen so that the words would comprise fully 40% of the words in a typical written sample of the natural languages under consideration, rather than only the 7 most frequently occurring. In this case, as different numbers of words are needed in the various languages to cover an equivalent percentage of the language, the length of the reference curves for the various candidate languages will differ.

The correlation formula used is:

$$\text{Corr(language)} = \text{Numerator}/\text{Denominator}$$

where $$\text{Numerator} = (i=1) \text{ SIGMA } (i=n)(Rx(1)*Sx(1))$$

and $$Rx(1) = r(1)-rb, r(2)-rb, r(3)-rb, \ldots, r(n)-rb \text{ and}$$

$$Sx(1) = s(1)-sb, s(2)-sb, s(3)-sb, \ldots, s(n)-sb \text{ and}$$

are the measured percent of occurrence of the n most common words in the given language in the reference curve and the sample curve and $$rb = (1/n)*(i=1) \text{ SIGMA } (i=n) \text{ } r(i) \text{ and}$$

$$sb = (1/n)*(i=1) \text{ SIGMA } (i=n) \text{ } s(i) \text{ and}$$

are the averages of the r and s values in the reference and sample curves respectively.

For the denominator, one has $$\text{Denominator} = (((i=1) \text{ SIGMA } (i=n)(R(1)-rb)**2*((i=1) \text{ SIGMA } (i=n)(S(1)-sb)2)).5$$

TABLE 2

Correlation Scores

| English | German | Danish |
|---|---|---|
| 0.838 | −0.112 | 0.0 |

This data illustrates that the correlation function provides a viable method of determining the natural language of a given body of text when used in conjunction with a reference curve as given below. In particular, when the percents of occurrence of the common words in a body of text in an unknown language are sufficiently similar to the percents of occurrence of the common words in a reference list drawn from a large body of text in a given language, this method allows the conclusion that the unknown body of text is in the same natural language as the words in the reference list. A score "1" is an exact match, but is unlikely. Generally, any high score, e.g., >0.5, is good. A 0.5 score can serve as a threshold that a sample is in a natural language when only a single reference curve for the natural language is used.

As shown above, the comparison is made from percent occurrence of the words in the reference sample to the percent occurrence of the words in the unknown sample. As shown below, raw counts will work equally well. The correlation function is not sensitive to a vertical translation of the curves. Therefore, it is acceptable to correlate percent data with count data or percent-to-percent or count-to-count. The only thing that affects the correlation score is the curve shape and percents are derived from counts by operations that do not affect the curve shape, only its vertical position (a translation) on the coordinate system. That is, regardless of the label on the y-axis, the correlation score of these two curves is unchanged. The calculations shown in Tables 4 and 5 are similar to those shown above in Tables 2 and 3, except that counts rather than percent data were used. A different sample was also used.

Figure 2:
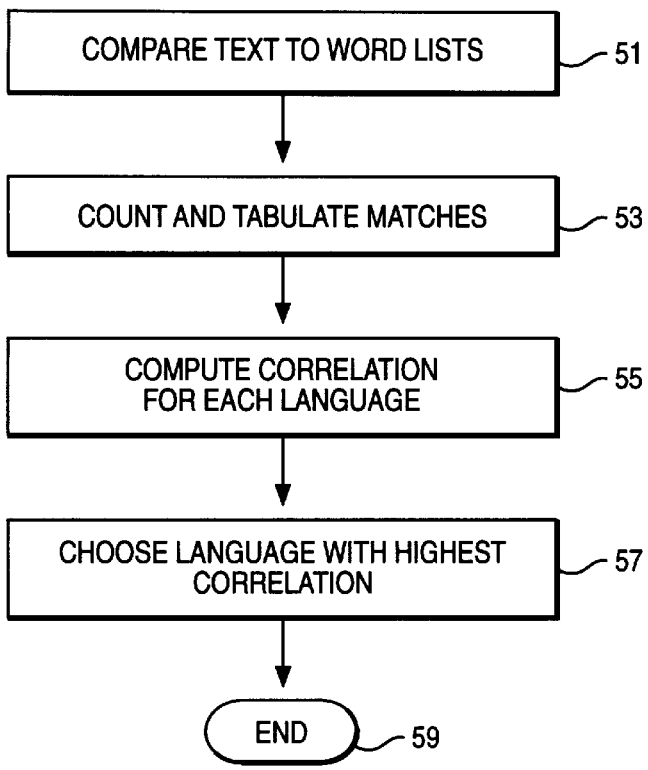
FIG. 2 is a flow diagram of one method for practicing the invention.
Figure 4:
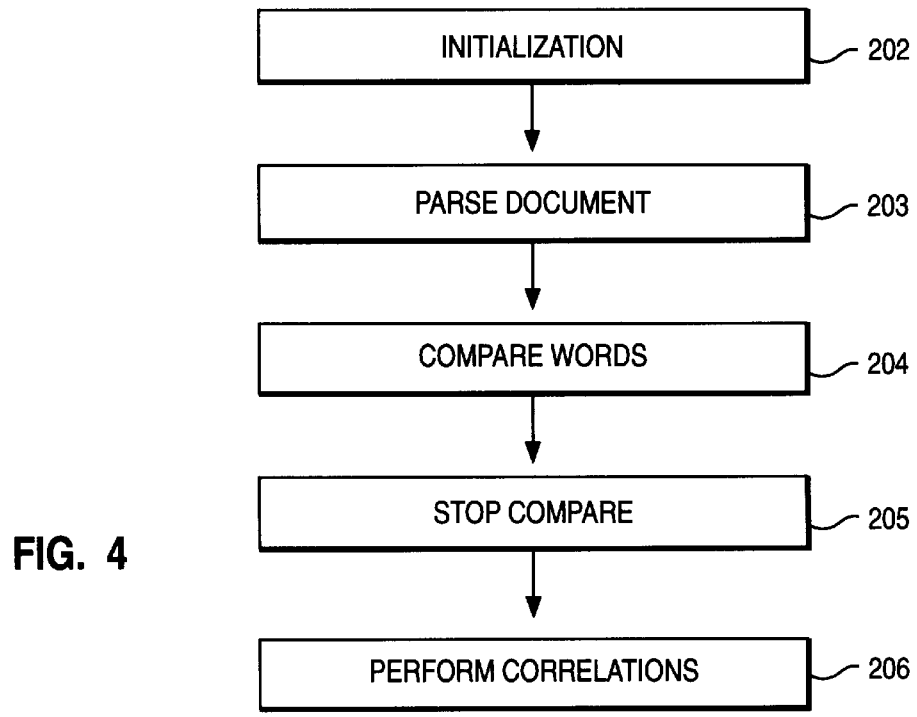
FIG. 4 is a flow chart of the sequence of general steps carried out in the process performed by the system shown in FIG. 3.

FIG. 2 shows a flow diagram of the process of correlating the text of a document in an unknown language to a plurality of reference curves for candidate languages. In step 51, the body of text in the unknown language is compared word by word to each of the common word lists for a given set of candidate languages. This step requires taking each word from the body of text and determining if its value occurs in one or more of the word lists. The occurrences of the common words in the body of text which also appear in the word lists are counted and tabulated for each word, step 53. For example, let the word lists be given by Table 4 below. Then, after this paragraph was processed, the counts for each of the three languages would be as shown in the table.

TABLE 3

Sample and Reference Counts for Selected Languages

| Engl | Rfnce | Smpl | Grmn | Refnce | Smpl | Dnsh | Rfnce | Smpl |
|---|---|---|---|---|---|---|---|---|
| the | 69971 | 15 | die | 102035 | 0 | i | 22114 | 0 |
| of | 36411 | 12 | und | 54655 | 0 | og | 21721 | 0 |
| and | 28852 | 2 | in | 48167 | 7 | at | 13572 | 0 |
| to | 26149 | 2 | den | 32879 | 0 | er | 13547 | 0 |
| a | 23237 | 4 | von | 27920 | 0 | det | 11481 | 0 |
| in | 21341 | 7 | zu | 27394 | 0 | en | 11458 | 0 |
| that | 10595 | 0 | das | 26120 | 0 | til | 11451 | 0 |

In step 55, given the tabulated counts for the words, e.g., as shown in the table above, compute the correlation score for each of the three languages. In the preferred embodiment, the function given above as the correlation function is used.

The results are shown below in Table 4.

TABLE 4

| Correlation Scores | | |
|---|---|---|
| English | German | Danish |
| 0.844 | −0.112 | 0.0 |

In step 57, the language with the largest correlation is chosen as the most likely candidate language from the plurality of languages under consideration. The process ends in step 59.

There are several refinements that can be made to improve the discrimination among the languages. These are discussed below in several alternative embodiments.

There are high frequency words that occur in more than one language. For instance, the word "in" is among the most frequently occurring words in English, German, Dutch, French and Italian, and there are several others. These words are called "strong aliases" in this application. In one alternative embodiment, the strong aliases are removed from the word lists. Experience has shown that the correlation scores are improved if the strong aliases are removed from the word lists for the candidate languages. Although removing the duplicate words changes the percent of coverage of each of the languages by different amounts, the net effect of alias removal is increased separation among the languages. The reduction in coverage can be compensated by adding other common words to the respective word lists, so long as they too are not strong aliases, thus bringing the coverage percentage up to a desired number. Note also that "aliases" are less of a problem in correlation, as opposed to simple counting since they are likely to have different frequencies from one language to the next. Also, for genre almost all words will be duplicates or aliases and therefore it would be impossible to remove any substantial number of them.

One benefit of correlation over simple counting is the ability to distinguish between relative frequency of occurrence of words—even if they are the same words and from one language or genre to the next, assuming the words have different frequencies of occurrence in the respective languages and genres.

In another alternative embodiment, the word lists, i.e reference curves, associated with each candidate language may be augmented with the other language word lists, but assigned a frequency of zero to their word occurrences. In empirical results, the correlation of the actual language of the sample with its reference curve is improved and the separation of the correct language from the others is increased. Rather than simply correlating the words in each language's word list counts with the unknown sample, this method causes words which do not belong to a language to bias the correlation score smaller. In effect, those words in the unknown sample which match the words in the reference word list tend to improve the correlation score and those which match one of the other languages tend to reduce the score, so that the words in the unknown sample will tend to correlate well with the correct reference curve and will tend to correlate poorly with the words in any of the other languages' word lists.

In yet another alternative embodiment, when both the reference curve and the sample count for a given word is zero, the word is dropped from the crosscorrelation calculation. In applying the correlation formula calculation to any given language reference count and unknown sample count, it is possible that either the sample or reference count is zero. The reference value for may be zero due to the use of cross-correlation of languages as described above. The sample curve value may be zero for the word since the particular word was not encountered in the given body of text. If both the sample and reference are zero for a particular word, the discrimination is improved if that word is dropped from the calculation. That this is so can be seen from the matrix in Table 5, which gives the type of information derived from the various combinations of zeros in the references and samples.

The matrix in Table 5 below is interpreted as follows. The "zero/zero" intersection means that if both the sample and reference count are zero for a given word, no information can be derived from this event. Hence, that word is dropped from the correlation. If the reference count is positive and the sample count is zero for a word, then this word is included in the correlation and will tend to bias the correlation negative for this particular candidate language. This is called "negative information", meaning that it works against this candidate language as the language of the unknown sample. Similarly, if the reference curve has a zero count and the sample curve a positive count for a given word, as occurs for those words added onto the reference curve for cross-correlation, then that word as well will count against the given language. Finally, when a word occurs in the reference curve and in the sample curve, its count will tend to increase the correlation. This is called "positive information" as it indicates that the candidate language is the correct language.

TABLE 5

| Sample | Zero Count | Positive Count |
|---|---|---|
| Zero | No Information | Negative Info |
| Positive | Negative Info | Positive Info |

Genre Recognition

As shown in the examples above, the correlation functions were not even close for incorrect languages. Simple methods disclosed in the parent and incorporated applications, such as simple counting or weighted counting where simple cumulative counts or weighted cumulative counts for each candidate language determine whether the text is in a given language, would probably suffice for most cases. However, since the differences are more subtle and since most words themselves are the same across the different genre, other methods invented by the applicants such as simple and weighted counting would not be expected to be effective unless there was a significant amount of text. Counting would require enough occurrence of the different words so that the small differences in percentages of occurrences would be detectable in the word counts. For example, if a 2% difference in the measured occurrence existed between two different genre, it would amount to a difference in the counts of a given word of 1 in 50 occurrences. Even for the most frequently occurring words, this forces a rather large sample. However, a 2% difference may not exist; since nearly equivalent cumulative counts may result from differently weighted sets of words. Correlation is sensitive to which words are present, counting is only sensitive to how many words were counted in total. Correlation is very effective at measuring the small differences in the counts, and the effectiveness can be increased by using more words.

The study of American English, "Computational Analysis of Present-Day American English," by H. Kucera and W. N. Francis, Brown University Press, Providence, RI, 1967, created a corpus (called The Corpus) of 1,014,232 words drawn from 500 samples of about 2000 words each in 15 different genre. The genre included press—reportage, editorial and reviews, five genre of fiction and one of humor among the 15.

As shown in Table 6 below, the word frequencies for various genre varies for the respective common words in American English:

TABLE 6

Genre Word Frequencies

| Word | Corpus | Low | High |
|------|--------|------|------|
| the  | 6.90   | 5.09 | 7.26 |
| of   | 3.59   | 1.89 | 4.89 |
| and  | 2.85   | 2.46 | 3.28 |
| to   | 2.58   | 2.05 | 2.96 |
| a    | 2.29   | 1.56 | 2.86 |
| in   | 2.10   | 1.36 | 2.35 |
| that | 1.05   | 0.72 | 1.42 |
| is   | 1.00   | 0.26 | 1.55 |
| was  | 0.97   | 0.36 | 1.87 |
| he   | 0.94   | 0.24 | 2.24 |

This table is built from the statistics on each of the common words in each of the 15 genre so that "the" occurs in one of the genre with a frequency of 7.26% versus its occurrence in The Corpus of 6.90% and "the" occurs in a different genre at the lowest frequency of 5.09%. The point is that for all 15 genre in the study, the frequencies of occurrences of the most highly used words vary from genre to genre.

While this variation is more subtle than that which is seen when looking at words in different languages, it is nevertheless real and can be used to distinguish among the genre.

One question that arises is the availability of the genre statistics. In fact, in most of the scholarly works which were used for the basic word frequency lists, genre statistics have been available. This is true for English, Danish, Spanish, Italian, French, and Portuguese, for example. However, even for those cases where the statistics are not readily available, measuring them is as simple as compiling the frequency counts for a language. A suitably large collection of text samples that belong to the genre in question are assembled, entered into a computing system and sorted by word spelling. When the sort is complete, one simply counts the numbers of occurrence of each of the "tokens." Rather than words, "tokens" are used since not everything that occurs in text is a word; there are abbreviations, numbers and symbols. The tokens other than words might or might not be germane in a given genre and can be included as determined by experience. Inclusion or exclusion will not affect any of the methods of language or genre determination as the algorithms are independent of the word lists.

Generating the Word Tables

In one preferred embodiment, the word tables are the result of reference to scholarly works in which a large sample of words from the respective candidate languages have been counted. Ser. No. 08/699,412 incorporated by reference above cites many scholarly references from which the word tables can be derived. Alternatively, as mentioned above, samples of text may be read into a computer system to generate the word tables. This approach may be more useful than using the sources when the particular environment mixes jargon, or colloquialisms, in one or more of the languages of interest, which often occurs, or if one is attempting to distinguish different genre in the same language.

The word tables for the correlation method include a list of the most common words and weights associated with the most common words. The weights can be computed in a variety of ways, although the applicants presently believe that the most preferred weight is as closely representative of the actual frequency of occurrence of the word in the language as possible. One particularly preferred method of storing the words is disclosed below.

Table 7 below demonstrates why relatively few words are required to be in a word table. The data for Table 7 are taken from Computational Analysis of Present-day American English by H. Kucera and W. N. Francis and published by the Brown University Press, Providence, R.I., 1967. It lists the twelve most common words in written English in MEASURED FREQUENCY order from top to bottom. The MEASURED FREQUENCY is stated as the average count for each common word per 100 words used in the (written) English language, determined over the total word count in a very large number of English documents. It is therefore the percentage of cases that a word randomly selected from a representative sample of written English text will be that particular word. MEASURED FREQUENCY is equivalent to frequency of occurrence, as that term has been previously used herein. Each CUMULATIVE FREQUENCY in the table is the sum of the MEASURED FREQUENCIES for all words in the table from that point and above. For example, the CUMULATIVE FREQUENCY of 20.307 as shown with the word "in" represents a plurality of common words comprising the six most frequently used words in the English language, i.e. the first six words: "the", "of", "and", "to", "a", and "in". The CUMULATIVE FREQUENCY of 20.307 is therefore derived by adding the MEASURED FREQUENCIES for these six words. Thus, in a representative sample of written English text, approximately 20% of the words in the text will be one of the first six words in Table 8; fully 26% will be one of the 12 words in the table. Thus, relatively few words represent a substantial portion of representative text. Similar tables showing similar statistics can be constructed for other languages.

TABLE 7

The Twelve Most Common English Words

| WORD | MEASURED FREQUENCY | CUMULATIVE FREQUENCY |
|------|--------------------|-----------------------|
| the  | 6.899              | 6.899                 |
| of   | 3.590              | 10.489                |
| and  | 2.845              | 13.334                |
| to   | 2.578              | 15.912                |
| a    | 2.291              | 18.203                |
| in   | 2.104              | 20.307                |
| that | 1.045              | 21.352                |
| was  | 0.995              | 22.347                |
| he   | 0.968              | 23.315                |
| for  | 0.941              | 24.256                |
| it   | 0.936              | 25.192                |
| with | 0.863              | 26.055                |

Language statistics, such as those shown above in Table 7, show that the words which are most common in a language are the most useful in making a language identification. The definition of a common word in a language is that it is a word that is used frequently in that language. As a result, common words from a language will appear in essentially all written communication; hence the process of this invention will find them.

Normalization or other efforts to make the frequencies in the word tables equivalent may be required because the sample sizes may be different from one language reference to the next, the sample sizes may be unknown, or the lists of the most common words taken from the samples may be different cumulative amounts of the different languages. Where one does not have the same amount of information of the same type for each language, normalization is generally a good idea. Where equivalent information is available for all of the candidate languages, normalization is not required. Ser. No. 08/723,815 incorporated by reference above discusses normalization techniques which can be used to construct the word tables.

A word table for the most frequently counted words in a given language or genre can be computed. As discussed above, where the actual frequency of the words within the language cannot be reliably determined, the following method can be used: Step 1: Determine a divisor. This is either the sample size, if known, or the sum of the counts of the n words in each word list. Step 2: For each of the words in each of the word lists for each of the given languages, divide its measured frequency of occurrence by the divisor from Step 1. Call this value the Normalized Frequency of Occurrence (NFO). Step 3: Associate each Normalized Frequency of Occurrence (NFO) with the respective word in the Word Frequency Tables. There may be more words in the word table for one candidate language than in the word table for another candidate language and one or more most common words may be excluded in a given word list to obtain equivalent coverage over all word tables. For example, in English, 46 words are adequate to give an approximate 40% coverage, whereas in Italian, 148 words are needed. Also, as mentioned above, for language discrimination, strong aliases may be removed from the word tables, necessitating the inclusion of other common words to make up the difference in coverage. For correlation, it is expected that equivalent coverage for each language is less important than for simple counting.

Table 3 above depicts portions of word tables for English, German and Danish. Note that the weighting factor is included in the tables. It is convenient to keep the weights in the word tables as these weights or percentages are those which comprise the reference curves. However, one skilled in the art would readily appreciate that the reference curves could be stored separately from the word tables.

The overall effect of these language statistics is that an examination of about 100–200 words from a document in an unknown language using the method of the present invention with the 25–200 most common words the in each of the candidate languages is ordinarily sufficient to determine the language of the document accurately. In the general case, the applicants try to achieve approximately 40 percent coverage of the language in the respective word tables. This can usually be achieved with fewer than 200 selected common words.

Example of Genre Discrimination

Discrimination among genre of the same language requires genre-specific language statistics such as those available in Kucera, op. cit. In Table 8, Sample & Reference Data for Genre Determination, a reduced set of such statistics is presented for five of the fifteen genre and the twelve most frequently occurring words. The statistics are for the genre A: Press Reportage, D: Religion, C: Belles Lettres, K: Fiction, General and N: Fiction, Western & Adventure. The genre-specific percent of occurrence of each of these is in the column for the indicated genre, so that "the" has an occurrence percentage of 7.19 for genre A, and 6.46 for genre N and so on. A sample of religious text obtained from the internet and counted the number of occurrences of each of the 12 words in the five genre lists. This is the data in the column labelled "Sample." The actual sample of text is:

The ABC's of Salvation

The Gospel is God's Power unto Salvation

"For I am not ashamed of the gospel: for it is the power of God unto salvation to everyone that believeth . . . " Romans 1:16. The word "gospel" means "good tidings" or "good news". The gospel of Christ is the good news of salvation through Christ.

"Now I make known unto you, brethren, the gospel which I preached unto you, which also ye received, wherein also ye stand, by which also ye are saved, if ye hold fast the word which I preached unto you, except ye believed in vain. For I delivered unto you first of all that which also I received: that Christ died for our sins according to the scriptures; and that he was buried; and that he hath been raised on the third day according to the scriptures;" I Cor. 15:1–4

To be Saved One Must Obey The Gospel

" . . . And to you that are afflicted rest with us, at the revelation of the Lord Jesus from heaven with the angels of his power in flaming fire, rendering vengeance to them that know not God, and to them that obey not the gospel of our Lord Jesus who shall suffer punishment, even eternal destruction from the face of the Lord and from the glory of his might." II Thess. 1:7–9

To Obey the Gospel is to Obey the Commands of the Gospel

The only things connected with the gospel which can be obeyed are the commands of the gospel. These commands are:

To Believe in Jesus as the Son of God.

To Repent of Sins.

To Confess Faith in Christ.

To Be Buried with Christ in Baptism.

Reverence to Our Father

FOR GOD SO LOVE THE WORLD THAT HE GAVE HIS ONE AND ONLY SON PRAY THE WAY OF THE CROSS

Try living your life with love according to some of our favorite Bible passage:

1 CORINTHIANS 13:1–13

If I speak in the tongues of men and of angels, but have not love, I am only a resounding gong or a clanging cymbal. If I have the gift of prophecy and can fathom all mysteries and all knowledge, and if I have a faith that can move mountains, but have not love, I am nothing. If I give all I possess to the poor and surrender my body to the flames, but have not love, I gain nothing.

Love is patient, love is kind. It does not envy, it does not boast, it is not proud. It is not rude, it is not self-seeking, it is not easily angered, it keeps no record of wrongs. Love does not delight in evil but rejoices with the truth. It always protects, always trusts, always hopes, always perseveres.

Love never fails. But where there are prophecies, they will cease; where there are tongues, they will be stilled, where there is knowledge, it will pass away. For we know in part and we prophesy in part, but when perfection comes, the imperfect disappears. When I was a child, I talked like a child, I thought like a child, I reasoned like a child. When I became a man, I put childish ways behind me. Now we see but a poor reflection as in a mirror; then we shall see face to face. Now I know in part; then I shall know fully, even as I am fully known.

And now these three remain: faith, hope and love. But the greatest of these is LOVE.

MARK 12:29–31

Jesus answered, The first is, Hear, O Israel; The Lord our God, the Lord is one: and thou shalt love the Lord thy God with all thy heart, and with all thy soul, and with all thy mind, and with all thy strength. The second is this, Thou shalt love thy neighbor as thyself. There is none other conmmandment greater than these.

This sample consists of about 650 tokens most all of which are English words.

Sample & Reference Data for Genre Determination

TABLE 8

Sample & Reference Data for Genre Determination

| Word | Sample | Genre A | Genre D | Genre G | Genre K | Genre N |
|------|--------|---------|---------|---------|---------|---------|
| the | 40 | 7.9 | 7.17 | 7.07 | 6.49 | 6.46 |
| of | 20 | 3.22 | 4.35 | 4.19 | 2.44 | 2.27 |
| and | 15 | 2.46 | 2.78 | 2.93 | 3.03 | 2.92 |
| to | 12 | 2.41 | 2.61 | 2.74 | 2.58 | 2.26 |
| a | 10 | 2.43 | 2.01 | 2.27 | 2.29 | 2.45 |
| in | 11 | 2.28 | 2.24 | 2.24 | 1.66 | 1.53 |
| that | 9 | 0.93 | 1.42 | 1.29 | 0.98 | 0.91 |
| is | 14 | 0.83 | 1.55 | 1.19 | 0.26 | 0.17 |
| was | 2 | 0.81 | 0.62 | 0.97 | 1.87 | 1.57 |
| he | 4 | 0.72 | 0.60 | 1.01 | 2.24 | 2.19 |
| for | 2 | 1.09 | 0.91 | 0.85 | 0.71 | 0.61 |
| it | 7 | 0.54 | 0.97 | 0.9 | 1.0 | 1.09 |

In Table 9 below are shown the correlation scores that were obtained when the Sample data were correlated against each of the 5 genre references for just the 12 words. As can be seen, the correlation score for genre reference D, Religion is the largest, leading to the conclusion that the writing sample belongs to the genre, Religion.

TABLE 9

Correlation Scores for the Sample and Genre Reference

| | Genre A | Genre D | Genre G | Genre K | Genre N |
|---|---------|---------|---------|---------|---------|
| Score | 0.9311 | 0.9707 | 0.9518 | 0.8158 | 0.8201 |

The sample size needed for genre discrimination is dependent on several different factors, including the number of different words that are included in the genre references, and the particular genre among which discrimination is desired. As can be seen from Table 10 above, there are significant differences in the percentages of occurrence of the first 12 words in these 5 genre. The 112th word, "state" occurs in only 14 of the genre identified in Kucera and Francis at the 397th word in overall frequency order occurs in only 10 of the 15 genre. Increasing the number of words in the references when the counts in the genre of interest are zero is not useful. The differences between two or more genre may be small so that larger amounts of sample text will be required for accurate discrimination. It is the applicants' belief that for genre discrimination in English, using the data of Kucera and Francis, 100 word references and 500 words of text will generally be sufficient. In many instances, smaller references or fewer words of text will be required. Furthermore, it is sometimes possible to trade-off reference length i.e. the number of words in the reference curve, and sample size. That is, using a longer reference will permit the accurate discrimination of shorter samples and shorter references may require longer samples for a given degree of accuracy.

Language Identification

The preferred embodiment of the present invention is the combination of a novel computer program executing in a conventional data processing system. Alternatively, the invention may be embodied in special purpose data processing hardware (not shown) which has separate comparator controls for operating with tables embedded in special storage hardware. In the preferred embodiment, an initial step is to assemble the word tables including the common words and their associated weights.

Figure 3:
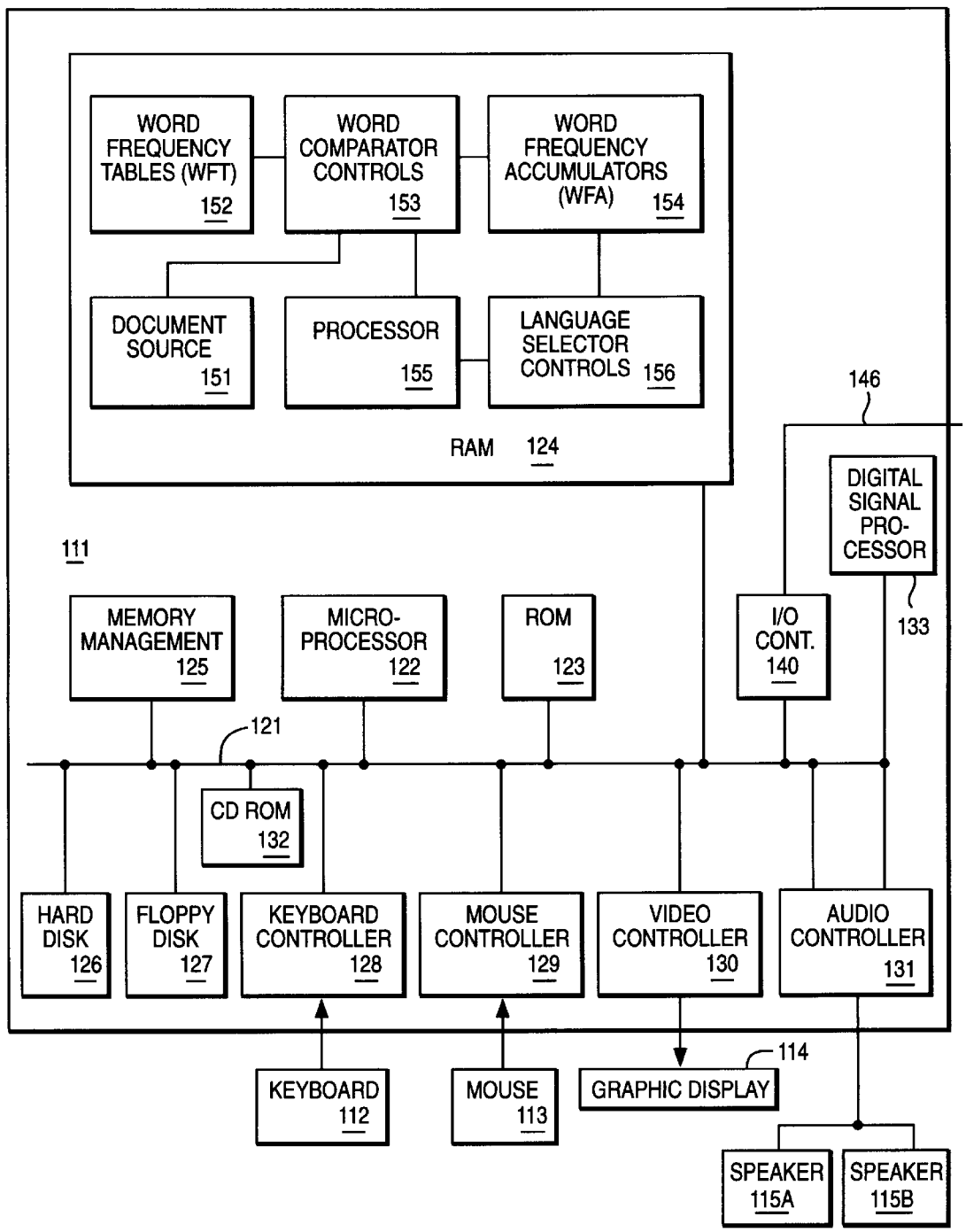
FIG. 3 is a functional block diagram of the current invention, a general data processing system containing data and controls for determining the language of a document.

FIG. 3 shows an overall block diagram of a general system configuration supporting an embodiment of the invention. It contains components which may be formed of hardware and/or software components in the system. The invention may be run on a variety of computers or collection of computers under a number of different operating systems. The computer could be, for example, a personal computer, a mini computer, mainframe computer or a computer running in a distributed network of other computers. Computers in the IBM PC series of computers could be used in the present invention running on the IBM OS/2 Warp 4.0 operating system. Again, the hardware requirements are very modest. The hardware embodiment could be implemented in an Intel 8086 processor with 16 KB of memory, probably less.

In FIG. 3, a computer, comprising a system unit 111, a keyboard 112, a mouse 113 and a display 14 are depicted in block diagram form. The system unit 111 includes a system bus or plurality of system buses 121 to which various components are coupled and by which communication between the various components is accomplished. The microprocessor 122 is connected to the system bus 121 and is supported by read only memory (ROM) 123 and random access memory (RAM) 124 also connected to system bus 121. The ROM 123 contains among other code the Basic Input-Output system (BIOS) which controls basic hardware operations such as the interaction and the disk drives and the keyboard. The RAM 124 is the main memory into which the operating system and application programs are loaded. The memory management chip 125 is connected to the system bus 121 and controls direct memory access operations including, passing data between the RAM 124 and hard disk drive 126 and floppy disk drive 127. The CD ROM 132 also coupled to the system bus 121 is used to store a large amount of data, e.g., a multimedia program or presentation.

Also connected to this system bus 121 are various I/O controllers: The keyboard controller 128, the mouse controller 129, the video controller 130, and the audio controller 131. As might be expected, the keyboard controller 128 provides the hardware interface for the keyboard 112, the mouse controller 129 provides the hardware interface for mouse 113, the video controller 30 is the hardware interface for the display 114, and the audio controller 131 is the hardware interface for the speakers 115. An I/O controller 40 such as a Token Ring Adapter enables communication over a network 46 to other similarly configured data processing systems.

One of the preferred implementations of the invention is as sets of instructions 151–156 resident in the random access memory 124 of one or more computer systems configured generally as described above. Until required by the computer system, the set of instructions may be stored in another computer memory, for example, in the hard disk drive 126, or in a removable memory such as an optical disk for eventual use in the CD-ROM 132 or in a floppy disk for eventual use in the floppy disk drive 127. The program may also be stored in the memory of another computer system to be sent over the network or an external network such as the Internet when desired. One skilled in the art would appreciate that the physical storage of the sets of instructions physically changes the medium upon which it is stored or transmitted electrically, magnetically, or chemically so that the medium carries computer readable information.

While it is convenient to describe the invention in terms of instructions, symbols, characters, or the like, the reader should remember that all of these and similar terms should be associated with the appropriate physical elements. Further, the invention is often described in terms of comparing or identifying, or other terms that could be associated with a human operator. No action by a human operator is desirable in any of the operations described herein which form part of the present invention; the operations are machine operations processing electrical signals to generate other electrical signals.

As described herein, the invention applies for any language or genre using an alphabet or ideographic symbols without regard to the printed symbols used for that language. As a computer document, all such symbols are processed as binary codes in a computer machine, rather than human readable symbols.

The data and logic blocks in RAM 24 are now discussed in greater detail. Coded data input is provided from a Document Source 151, which provides coded characters representing text of a document generated by using words of any human language. Before resident in RAM, document source 151 may be provided by an optical character reader reading the coded characters from a hard copy of a document. Alternatively, source 151 may be coded characters read from a soft copy of a document stored in an internal storage, e.g., floppy disk, tape or compact disk of the system, or source 151 may originate as coded characters transmitted on a network to the data processing system from some remote location using a similar system reading the document from one of its terminals or peripheral devices.

Each of the word tables 152 is associated with a respective language which can be detected as the language of source document 151. The construction of the word tables is as set forth above. The set of particular languages represented by tables 152 are called herein the languages of interest, or candidate languages. A language not represented in tables 152 cannot be detected as the language of the incoming document source 101.

The text from the source 151 is provided in variable-length word units to the comparator 153. In a hardware embodiment, the comparator can be part of a processor. Comparator controls 153 compare each variable length word received from source 151 with words in a plurality of language word tables 152. More than one word table may be associated with a particular language. For example, words of different lengths may be stored in different word tables for a respective language. Thus, in these embodiments, it would make sense to compare only those words of the same length to the words in the appropriate word table.

Each word received from document source 151 is compared by the comparator 153 with the words in the tables 152. The comparator 153 determines an equal or unequal condition between each inputted document source word and each table word read from the word tables 152. The words in each of the plurality of the word tables 152 may be scanned until all words in all of the tables 152 are compared by the comparator 153.

In the invention, a plurality of accumulators 154 are preferably associated with a candidate language, each accumulator for one word in the language's word table. Thus, the aggregated totals for each word are used to generate the sample curve which is compared to the reference curves of the respective languages.

The compare processing stops when the source words stop being inputted. This may occur when the document source 151 reaches the end of the current document or reaches a predetermined number of words, i.e. some minimum number of words are supplied by the document source 151. Alternatively, the sample curves may be periodically correlated to the reference curves. The process stops when the correlation for the sample curve in one set of accumulators 154 exceeds that for the next highest-valued set of accumulators 154 by a predetermined amount or factor. The correlation of sample curves to the reference curves could also be compared to a predetermined correlation factor. Once the correlation factor of me sample curve with a corresponding sample curve exceeds the predetermined correlation, the comparison process stops.

If correlation is not continuously calculated as the words are compared, after the compare processing stops for a document source 105, the language selector process 156 is queried by the processor 155. The language selector process 156 accesses all aggregated values in all accumulators 155 and determines which set of accumulators contain the sample curve with the highest correlation value through the correlation calculations discussed above. Alteratively, a separate correlation process calculates the correlations by keeping the correlation process separate from the selection process, one can use a digital signal processor for the correlation computation and keep the language selection in the software. Note that in the alternative embodiments, the compare correlation and selection processes may be iteratively commingled.

The language associated with the set of accumulators containing the sample curve with highest correlation value is outputted by the language selector 156 as the identified language.

The process in the flow chart of FIG. 3 shows the general sequence of steps by which a document is processed and its language determined. Each of steps 202, 203, 204, 205 and 206 operates under control of a processor in the data processing system. Step 202 provides initialization of a data processing system for executing the invention using word tables and accumulators for the languages of interest. Step 202 loads the word tables and accumulators into the system main memory from a storage medium, on which they were stored after they were previously prepared, and their addresses in main memory are passed to the process in FIG. 2 for use in its execution. This step also sets the accumulators to a zero state. Step 203 parses the document into its constituent words, i.e. the first word and a sequence of following words. Each word from the source document which is having its language determined is transferred to the comparison process in step 204. The first word need not be the actual first word in the document, and it may be located anywhere in the source document, and it is generally the first text word after any non-text data in the source document. Non-text data will generally be skipped in the sequence of data provided to the process in FIG. 3.

Step 204 compares each source word with the common words in word tables. Step 204 adds a count to the current sum in the accumulator for the matched word associated with the word table for a respective candidate language.

Step 205 determines when to stop processing a document. This may be when any of the following conditions are detected:

1. The entire document is read and all words compared to the word tables. This may be determined by recognizing an end-of-document signal, by knowing the size of the document and tracking the amount of text processed, by sensing that a time has expired during which no input has been received as an indication of the end of a document, or by relying on the data processing system's file-processing subsystem to report end-of-file.

2. A predetermined number of words from the document have been processed. It has been found that only a hundred words or so may be needed from a document to identify its language. Thus, all words in a large document need not be read and processed by the subject invention.

3. After some minimum number of words are processed, a predetermined correlation factor is reached or, alternatively, a difference between the correlations for the highest-valued and the next-highest-valued set of accumulators is achieved. It has been found that once the correlations for the candidate languages diverge, it is extremely unlikely that additional processing will result in the then-highest-valued accumulator being exceeded by another accumulator when the entire document is processed.

Step 206 is entered after the end of document is sensed by step 205. Step 206 calculates the correlations for the values in all of the accumulators and finds the set of accumulators which correlate most closely to the relevant reference curve. Step 206 outputs the language name content of the language field associated with the accumulator having the largest value to determine the identified language.

Partial Word Embodiment

The applicants have shown several ways in which the natural language of a body of text can be determined using very short word lists consisting of the most frequently used words of a natural language. In one preferred embodiment, it is not necessary to use entire words, but word fragments, which are akin to word roots or stems, will work equally well. Such partial or truncated words are useful in that they eliminate the programming problems that are often associated with variable length string processing by allowing for the use of fixed length four or fewer characters fields whose natural length of 32 bits are handled particularly well by most stored program digital processing systems.

Further advantages are derived from the use of registers to contain fully the word fragments so that they may typically be handled in a single register-to-register or register-to-storage cycle. These advantages include faster execution of the programs, better alignment of the data area within the memory and caches of the machines, and reduced bus traffic attributable to grater-than-bus-width data operands.

For example, consider the American English word list which ranks the word "some" among the 75 most frequently used words. "Some" occurs in American English with a frequency of occurrence of 0.15943%, or about 159 times in every 100,000 words. If however, only words of from 1 to 4 characters are processed and the first four characters of all longer words, then each of the following words will also be counted as "some" "someone," "sometime," "something," "somewhere," "somewhat," and "somehow." This will improve the count and weight methods for American English for a document which is written in English and do so without increasing the number of words that must be carried in the word list. Similar high frequency American English words which display this behavior include, "with", "have", "were", "when", "will", "more", "what" and so forth. For the highly declined languages like French,and Italian, the effect is more pronounced. The Semitic languages which include Hebrew and Arabic and which make far more extensive use of roots and stems are likely to work even better.

There is nothing magic about the use of four character words, although at present this length seems most natural.

There are languages whose common words will tend to be long, e.g., Hawaiian. In an alternate embodiment, the entire word is not stored, but only an abbreviation of the word. The abbreviation preferably will be constant for all words, e.g., the first four or five letters. In English, for example, among the first 96 most common words, only two are longer than five letters, "before" and "through". For Italian, of the 148 most commonly occurring words representing roughly 40% of written Italian, only 16 have 6 letters and one has 7 letters. The words are:

"allora," "ancora," "essere," "giorno," "grande," "perche*," "quando," "quanto," "quella," "quelle," "quello," "questa," "questi," "questo," "sempre," "stesso," and "qualche."

The * means there is an accent over the final "e" of "perche" that may will not display correctly on certain terminals.

Taking only the first five letters would cause "quella," "quelle," and "quello," to be counted as one word and similarly for "questa," "questi" and "questo." This form of aliasing, which in the invention is called "weak aliasing", is where one or more words masquerades within the word storage tables as another word from the same language. Weak aliasing is not a problem for the invention. Longer words may be truncated and be counted as having the same five letters unless the system were programmed to take only words of a certain length. Thus, other words which are not the most common words would also be counted. Counting "quella" for "quelle" does not matter so long as it is counted for the same language. The second kind of aliasing, is called strong aliasing, where a word or its abbreviation in one language masquerades in the word storage tables as a word from a different language can be a problem. For example, if the high frequency word "das" occurs in candidate language 1 (German) and masquerades in candidate language 2, (French) then the word count for candidate language 2 will be incorrectly biased larger than it actually was by the strong aliasing of "das".

While the embodiments above have used the well known mathematical correlation function to compare the sample counts from the document to the reference counts, there are other equivalent ways to compare the two. What is important, and what distinguishes this invention from simple counting, is that the individual elements, that is, the sample and reference counts for the individual words, are compared with respect to each other, rather than an aggregate count for all the compared words. The correlation function is simply the best way known to the applicants to accomplish this goal.

While the invention has been shown and described with reference to particular embodiments thereof, it will be understood by those skilled in the art that the foregoing and other changes in form and detail may be made therein without departing from the spirit and scope of the invention.

We claim:

1. A method for identifying the language of a document in which a computer document is written, comprising the steps of:

comparing a plurality of words from the document to a word list associated with a candidate language, wherein words in the word list are a selection of a small number of the most frequently used words in the candidate language;

accumulating a count of matches between words in the document and words in the word list for each word in the word list to produce a sample count for each word in the word list;

correlating the sample count to a reference count for each word in the word list for the candidate language to produce a correlation score for the candidate language, wherein the correlation score is a statistical measure of a collective strength of association between the sample counts and reference counts; and identifying the language of the document based on the correlation score.

2. The method as recited in claim 1 wherein the comparing, accumulating, correlating and identifying steps are practiced for a plurality of candidate languages each with a respective word list and a respective reference count for each word in the word list and the language of the document is identified as the candidate language having a reference count which generates a highest correlation score.

3. The method as recited in claim 2, wherein sample counts are produced for each respective candidate language and the sample counts and reference counts consist of counts for individual words in the word list for the respective candidate language.

4. The method as recited in claim 2, wherein one sample count is produced for each matching word in the document and the sample counts and reference counts comprise counts for individual words in a plurality of candidate languages.

5. The method as recited in claim 4, wherein a count for a word is dropped from the correlating step if the count for the word in the reference count and the sample count are both zero.

6. The method as recited in claim 2 wherein the words in each word list have a substantially equivalent aggregate frequency of occurrence within the respective candidate language as the words in the other word lists.

7. The method as recited in claim 2 wherein the process stops when a highest correlation score for a first respective candidate language exceeds a next highest correlation score for a second candidate language by a predetermined amount.

8. The method as recited in claim 1, wherein a single candidate language is compared to the document and the language of the document is identified as the candidate language if the correlation score exceeds a predetermined score.

9. The method as recited in claim 1 wherein the comparing, accumulating, correlating and identifying steps are practiced on all the words in the document.

10. The method as recited in claim 1 wherein the process stops when the correlation score exceeds a predetermined score.

11. The method as recited in claim 1 wherein words from the document greater than a predetermined length are truncated before the comparing step.

12. A system including processor and memory for identifying the language of a document in which a computer document is written, comprising:

means for comparing a plurality of words from the document to a word list associated with a candidate language, wherein words in the word list are a selection of a small number of the most frequently used words in the candidate language;

means for accumulating a count of matches between words in the document and words in the word list for each word in the word list to produce a sample count for each word in the word list;

means for correlating the sample count to a reference count for each word in the word list for the candidate language to produce a correlation score for the candidate language, wherein the correlation score is a statistical measure of a collective strength of association between the sample counts and reference counts; and means for identifying the language of the document based on the correlation score.

13. The system as recited in claim 12 wherein the comparing, accumulating, correlating and identifying means for a plurality of candidate languages each with a respective word list and a respective reference count and the language of the document is identified as the candidate language having a reference count which generates a highest correlation score.

14. The system as recited in claim 13, wherein sample counts are produced for each respective candidate language and the sample counts and reference counts consist of counts for individual words in the word list for the respective candidate language.

15. The system as recited in claim 13 wherein the words in each word list have a substantially equivalent aggregate frequency of occurrence within the respective candidate language as the words in the other word lists.

16. The system as recited in claim 13 wherein the system stops when a highest correlation score for a first respective candidate language exceeds a next highest correlation score for a second candidate language by a predetermined amount.

17. The system as recited in claim 13 wherein words from the document greater than a predetermined length are truncated before the comparing step.

18. The system as recited in claim 12, wherein a single candidate language is compared to the document and the language of the document is identified as the candidate language if the correlation score exceeds a predetermined score.

19. The system as recited in claim 12 wherein the system stops when the correlation score exceeds a predetermined score.

20. A computer program product in a computer readable medium for identifying the language of a document in which a computer document is written, comprising:

means for comparing a plurality of words from the document to a word list associated with a candidate language, wherein words in the word list are a selection of a small number of the most frequently used words in the candidate language;

means for accumulating a count of matches between words in the document and words in the word list for each word in the word list to produce a sample count for each word in the word list;

means for correlating the sample count to a reference count for each word in the word list for the candidate language to produce a correlation score for the candidate language, wherein the correlation score is a statistical measure of a collective strength of association between the sample counts and reference counts; and means for identifying the language of the document based on the correlation score.

21. The product as recited in claim 20 wherein the comparing, accumulating, correlating and identifying means use a plurality of candidate languages each with a respective word list and a respective reference count and the language of the document is identified as the candidate language having a reference count which generates a highest correlation score.

22. The product as recited in claim 21, wherein sample counts are produced for each respective candidate language and the sample counts and reference counts consist of counts for individual words in the word list for the respective candidate language.

23. The product as recited in claim 21, wherein one sample count is produced for each matching word in the document and the sample counts and reference counts comprise counts for individual words in a plurality of candidate languages.

24. The product as recited in claim 21, wherein a single candidate language is compared to the document and the language of the document is identified as the candidate language if the correlation score exceeds a predetermined score.

25. The product as recited in claim 20 wherein words from the document greater than a predetermined length are truncated before the comparing step.

* * * * *